United States Patent [19]
Harada et al.

[11] Patent Number: 4,868,598
[45] Date of Patent: Sep. 19, 1989

[54] CAMERA

[75] Inventors: Yoshihito Harada; Masayoshi Kiuchi; Ryuichi Kobayashi; Masaharu Kawamura, all of Kanagawa, Japan

[73] Assignee: Canon Kabushiki Kaisha, Tokyo, Japan

[21] Appl. No.: 217,063

[22] Filed: Jul. 5, 1988

Related U.S. Application Data

[63] Continuation of Ser. No. 799,444, Nov. 19, 1985, abandoned.

[30] Foreign Application Priority Data

| Nov. 21, 1984 | [JP] | Japan | 59-246736 |
| Dec. 6, 1984 | [JP] | Japan | 59-257954 |
| Dec. 21, 1984 | [JP] | Japan | 59-271259 |
| Dec. 28, 1984 | [JP] | Japan | 59-276497 |

[51] Int. Cl.$^4$ .......................................... G03B 17/18
[52] U.S. Cl. ............................................... 354/472
[58] Field of Search .................. 354/465, 471–475; 356/221, 222, 226, 227

[56] References Cited

U.S. PATENT DOCUMENTS

| 4,029,421 | 6/1977 | Sakurada et al. | 356/223 |
| 4,176,955 | 12/1979 | Yamada et al. | 356/226 X |
| 4,309,090 | 1/1982 | Yamada | 354/474 X |
| 4,309,091 | 1/1982 | Fukuhara et al. | 354/472 X |
| 4,373,793 | 2/1983 | Taniguchi et al. | 356/222 X |
| 4,396,263 | 8/1983 | Yamada | 354/471 |
| 4,589,755 | 5/1986 | Maitani et al. | 354/472 X |
| 4,655,576 | 4/1987 | Yuasa et al. | 354/472 |

Primary Examiner—W. B. Perkey
Attorney, Agent, or Firm—Toren, McGeady & Associates

[57] ABSTRACT

A camera employing a multi-photometric method of repeatedly performing a light measuring operation every time an operation member is operated to determine an exposure value on the basis of every measured value of light thus obtained is arranged to display the value of light measured by each of performances of the multiple light measuring operation in such a mark that indicates which of the performances is represented by the display mark.

7 Claims, 12 Drawing Sheets

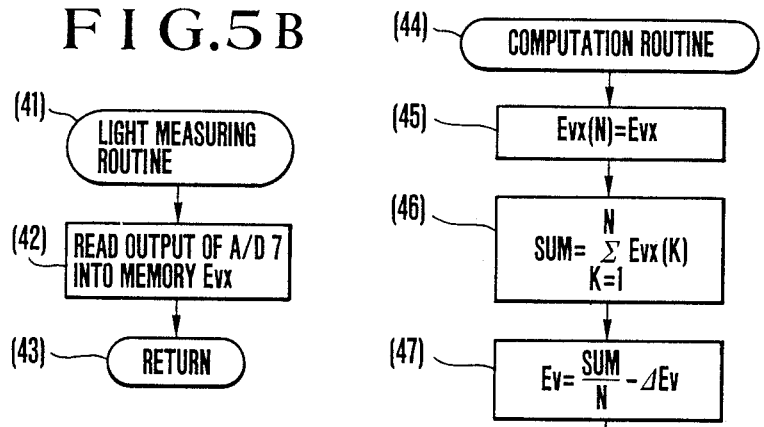
FIG.5B
FIG.5C
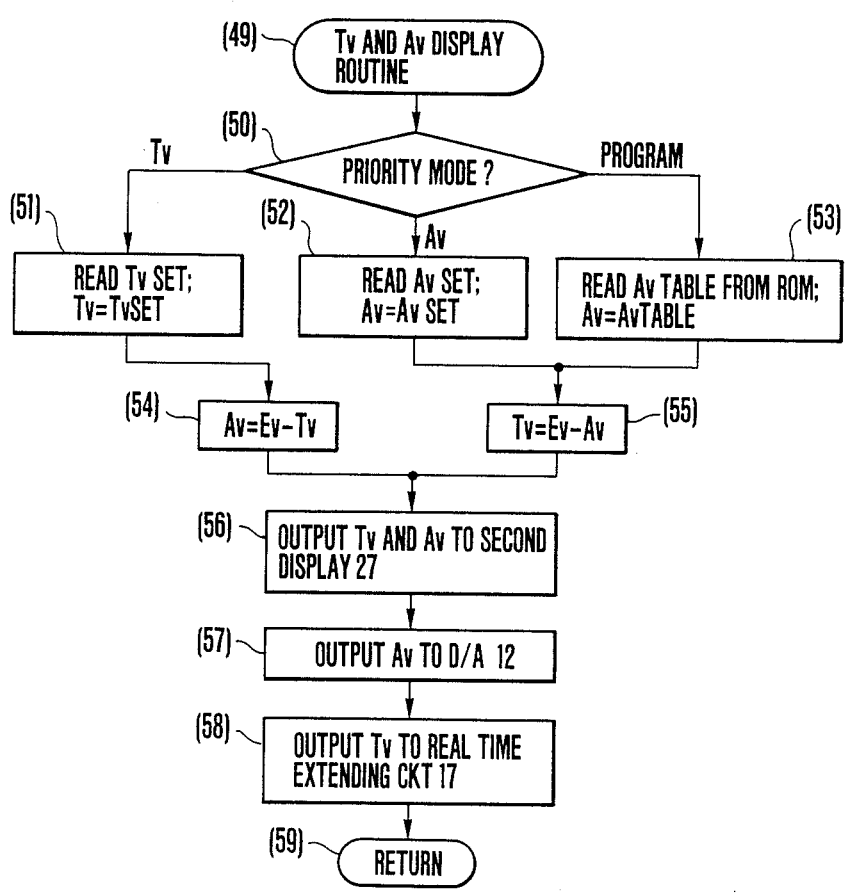
FIG.5D

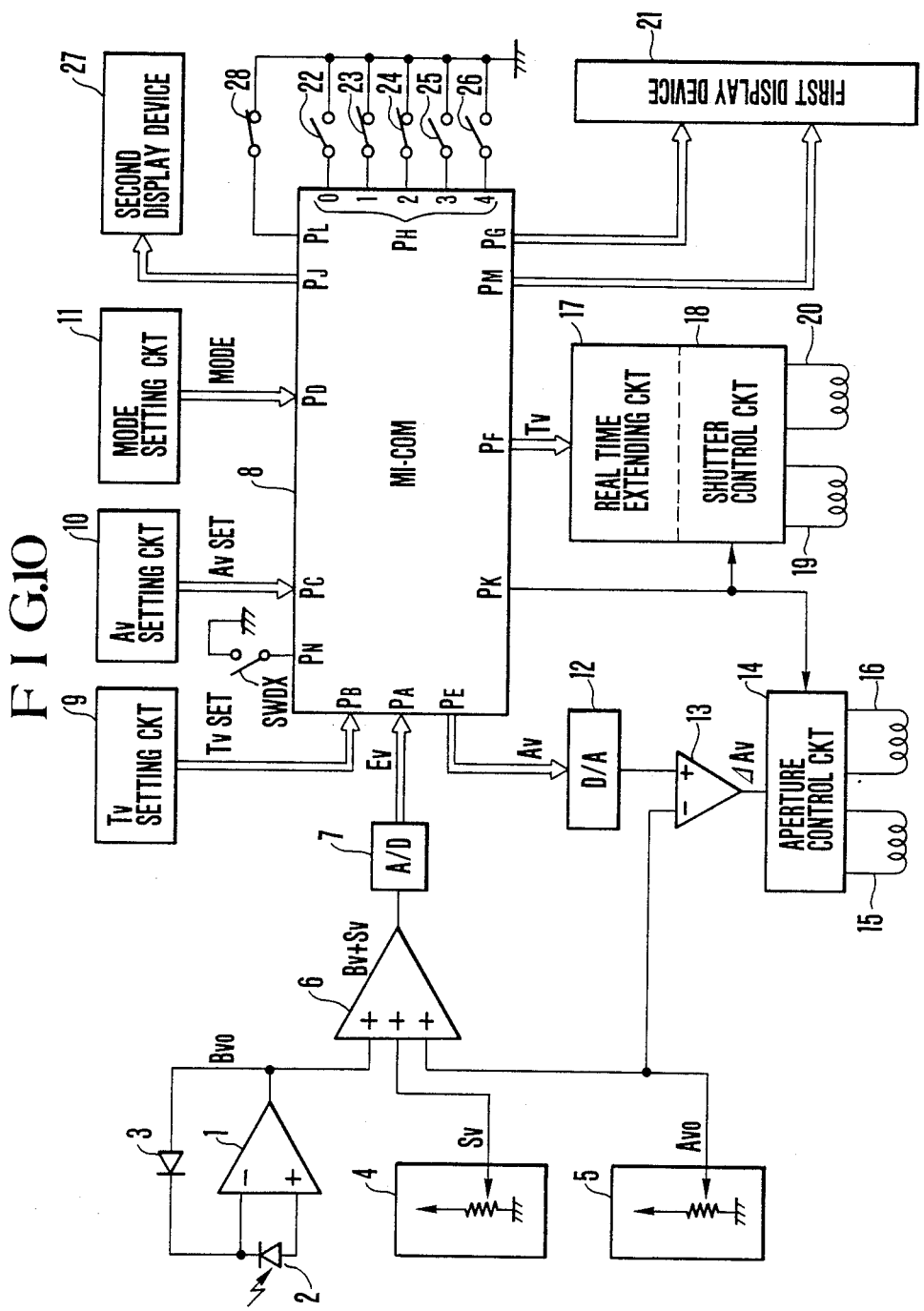

CAMERA

This is a continuation of application Ser. No. 799,444, filed Nov. 19, 1985, now abandoned.

BACKGROUND OF THE INVENTION

1. Field of the Invention

This invention relates to a camera, and more particularly, to a camera capable of performing a multiphotometric operation.

2. Description of the Prior Art

There have been known cameras of the kind arranged to repeatedly perform a light measuring operation a plurality of times; to obtain a control exposure value (to be used for controlling an actual shutter-speed or -time or an actual aperture value) by computing a measured light value on every performance of the repeating light measuring operation; and to display the measured light value thus obtained each time the light measuring operation is performed along with the control exposure value. An example of cameras of this kind is disclosed in Japanese Laid-Open Patent Application No. Sho 59-2024.

The display devices of the cameras of the above-stated kind have been arranged to display the exposure value and the measured light value of each light measuring performance in absolute values. This arrangement has necessitated use of a display device which is capable of making a display on a display scale over a wide range. The prior art arrangement thus has resulted in a large display device. For example, the device disclosed in the above-cited Japanese patent application is arranged as follows: In the case of a multi-photometric operation under an automatic exposure control condition, a shutter time value is obtained by performing a computing operation on a film sensitivity information value and the aperture value of the photo-taking lens of the camera, together with each of the measured light values obtained by a plurality of light measuring performances; the shutter time value thus obtained is displayed in a dot display on a scale provided for shutter time values; and then, a control shutter time value, which is obtained by computing the film sensitivity information value and the aperture value of the lens together with a control light measurement value obtained in a predetermined algorithm from the measured light values obtained by the plurality of light measuring performances, is displayed in a bar display on the above-stated scale. The camera is thus arranged to make a so-called absolute value display and is incapable of making a relative value display in the event of multi-photometric operation under an automatic exposure control condition.

In a conceivable method for solving this problem, a display device is arranged to make a relative value display showing the difference or a deviation value of the measured light value of each of the plurality of light measuring performances from the above-stated control exposure value with the latter arranged in the middle of the display. However, the control exposure value might be changed and renewed, accordingly as the multi-photometic operation is performed. In that event, the deviation value of the measured light value of each light measuring performance from the control exposure value is also renewed accordingly. Then, with the light measurement repeated, a plurality of times, it becomes difficult to accurately correlate a specific displayed deviation value with one of the plurality of performances of the light measuring operation.

Further, the camera capable of performing the multi-photometric operation enables the photographer to perform a photographing operation with a sufficiently high grade of photographic technique as it gives an exposure value suited for attaining a desired photographic effect. Whereas, in the conventional camera, exposure correction is arranged to be made by setting a corrected value through a correction setting dial or the like. Once a correction value is set, the set correction value cannot be cancelled unless the set state of the correction setting dial is manually operated to cancel the setting value. In other words, after a measured light value obtained by a multi-photometric operation has been corrected by setting a correction value, the set correction value remains as it is even if a further photometric operation is performed. Therefore, in that event, the previously set correction value prevents the photographer from knowing an actual measured value obtained by the further photometric operation.

The camera capable of performing the multi-photometric operation is provided with a light measuring button which is arranged for the multi-photometric operation separately from a shutter release button, because: In the case of a camera of the kind having one and the same button arranged to perform combined functions as a light measuring button and a shutter release button and to perform a photometric operation in response to the first stroke of a pushing operation on the release button, a multi-photometric operation can be accomplished by repeating the pushing operation just to the first stroke a desired number of times. However, after the multi-photometric operation, when the release button is pushed down to the second stroke thereof for shutter release, this pushing operation inevitably includes the first stroke as well as the second stroke. Then, this results in a new light measuring operation which changes a control exposure value obtained through the multi-photometric operation.

However, even in the camera of the kind having a light measuring button separate from the shutter release button, if the release button is pushed down while the light measuring button is being pushed down, a new unintended light measuring operation would be caused by the depressing operation on the release button. In that event, the light value which is measured by pushing the light measuring button would be changed by the unintended light measuring operation.

SUMMARY OF THE INVENTION

It is an object of this invention to provide a camera of the kind arranged to be capable of performing a multi-photometric operation, wherein the problem of the prior art display device mentioned in the foregoing is solved by an arrangement to display the relation of a light value measured by each performance of the multi-photometric operation to a computed control exposure value obtained by a computing operation on the light values measured by the multi-photometric operation.

It is another object of this invention to provide a camera wherein, in making the above-stated relative display, when a light measuring operation is newly performed, the values of light measured by a plurality of performances of the light measuring operation are displayed relative to the above-stated computed control value one after another in time series, and in such display, marks are included that indicate which of the performances is represented by each of the display marks.

It is a further object of this invention to provide a camera, wherein, when the above-stated new light measuring operation is performed, a correction information value which is previously set is automatically cancelled, so that the problem mentioned in the foregoing can be solved.

It is a still further object of this invention to provide a camera, wherein even when a shutter release member is operated while a storing operation member, or a light measuring button, is in operation, the operation on the release member is inhibited from causing a new light measuring operation, so that a value of light measured by a depressing operation performed on the light measuring button can be protected from being changed by the operation on the release member.

These and further objects and features of this invention will become apparent from the following detailed description of preferred embodiments thereof taken in connection with the accompanying drawings.

BRIEF DESCRIPTION OF THE DRAWINGS

FIG. 10 is a circuit diagram showing the circuit arrangement of a camera embodying this invention as another embodiment thereof.

DETAILED DESCRIPTION OF THE PREFERRED EMBODIMENTS

Figure 1:
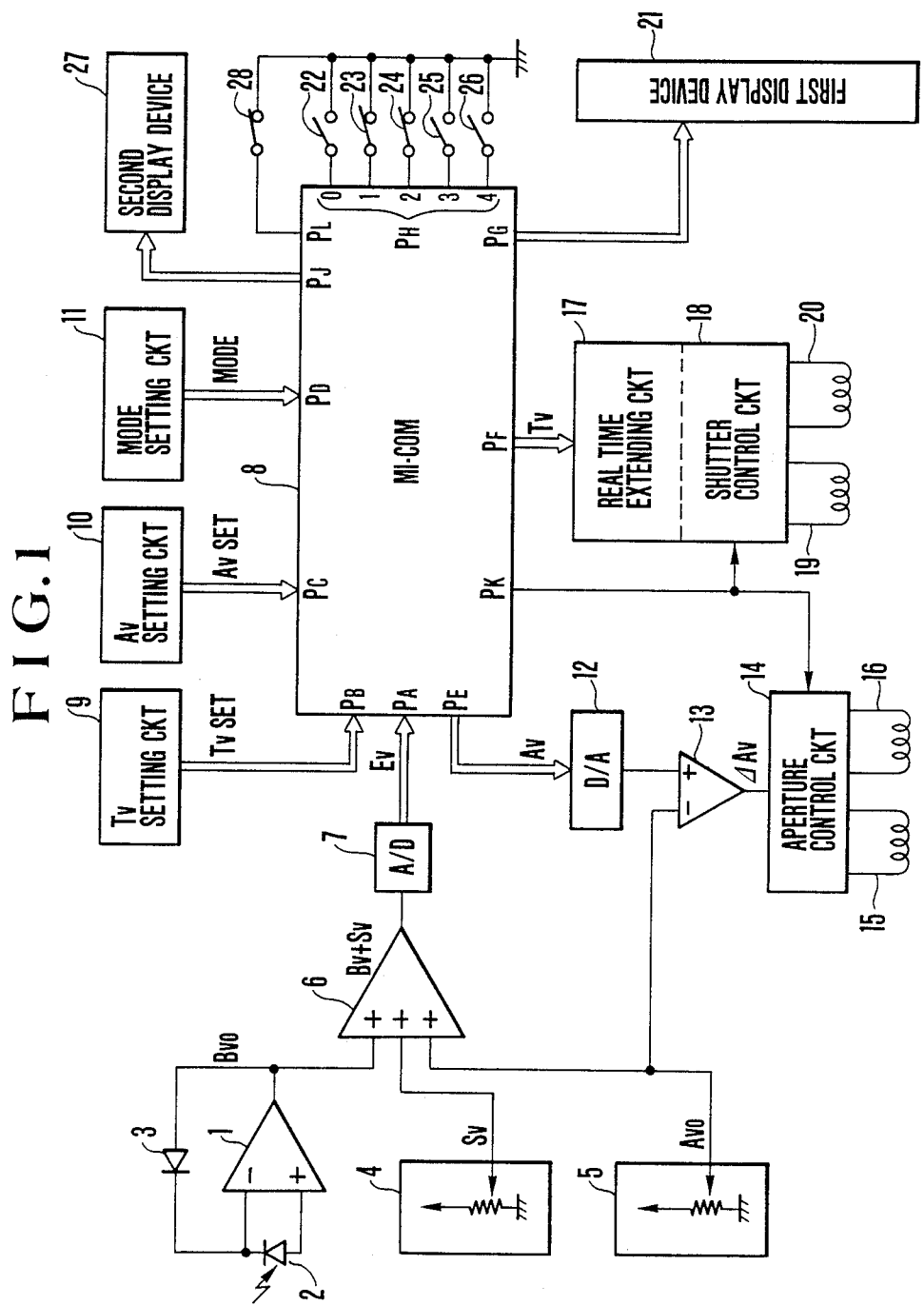
FIG. 1 diagram showing the circuit arrangement of a camera embodying this invention.

FIG. 1 shows, in a block diagram the whole circuit arrangement of a camera embodying this invention. The illustration includes elements 1, 2 and 3 which jointly form a light measuring circuit arranged to produce a measured value of light. They include a light measurement amplifier 1; a light measuring sensor 2; and a logarithmic compression diode 3. The light measuring sensor 2 is a spot sensor which is arranged to receive light from a relatively small area and has a sensitive area corresponding to the diameter of a split prism disposed in the middle part of a viewfinder field. The brightness of an object to be photographed is measured by the light measuring circuit, which consists of the above-stated elements 1, 2 and 3, through a photo-taking lens at a maximum open aperture thereof. The light measurement output Bvo, which is an APEX value representing the brightness measured at the open aperture and is obtained by the light measuring circuit, is supplied to one of the input terminals of an addition circuit 6. A film sensitivity information forming circuit 4 is arranged to form ISO information on the sensitivity of film as an APEX system values. The film sensitivity APEX valve Sv is supplied to another input terminal of the addition circuit 6. An open aperture signal circuit 5 is arranged to produce the maximum open aperture value Avo of the lens as an APEX system value. The open aperture value Avo is supplied to a further input terminal of the addition circuit 6. The open aperture value Avo is also supplied to the negative input terminal of a differential circuit 13.

At the addition circuit 6, the signals from the above-stated circuits 3, 4 and 5 are added together and an APEX computation is performed as follows: $Bvo+Sv+Avo=Bv+Sv=Ev$. A computed value thus obtained is analog-to-digital converted by an analog-to-digital (hereinafter referred to as A/D for short) converter 7. The A/D converted value is then supplied to an input port PA of a microcomputer 8 (hereinafter will be called MI-COM for short).

Reference numerals 9, 10 and 11 denote information setting circuits. A Tv setting circuit 9 is provided for setting a shutter time value (hereinafter will be called a setting value Tv). An Av setting circuit 10 is provided for setting an aperture value (hereinafter will be called a setting value Av). A mode setting circuit 11 is provided for setting one of photographing modes including a shutter time (Tv) priority mode, an aperture (Av) priority move, a program mode, etc. These information setting circuits are respectively connected to the input ports PB, PC and PD of the MI-COM 8. Further, each of these circuits 9, 10 and 11 is arranged to set the information in the form of a digital value. The MI-COM 8 is provided with input ports PA, PB, PC, PD, PH and PL and output ports PE, PF, PG, PJ and PK. The MI-COM 8 includes a first timer and a second timer which are arranged separately from each other. Each of the first and second timers is arranged to begin down counting (a time counting operation) when a predetermined length of time is set and to permit reading of a remaining length of time before the end of the set length of time.

A D/A (digital-to-analog) converter 12 is arranged to convert an Av value produced from the port PE of the MI-COM 8. The analog converted Av value is supplied to the positive input terminal of the differential circuit 13. The differential circuit 13 performs a computing operation to obtain a difference of this Av value from the above-stated open aperture value Avo, i.e. a number of stopped down steps from the maximum aperture, in the form of an APEX difference value $\Delta Av$. An aperture control circuit 14 is arranged to energize, in response to a trigger signal produced from the port PK of the MI-COM 8, a start magnet 15 which is arranged to actuate an aperture control member which is not shown. The aperture is stopped down from the maximum open aperture as much as the difference value $\Delta Av$ produced from the differential circuit 13. After completion of the stopping down operation, the stopping magnet 16 is energized to bring the aperture control action of the aperture control member to a stop.

Figure 2:
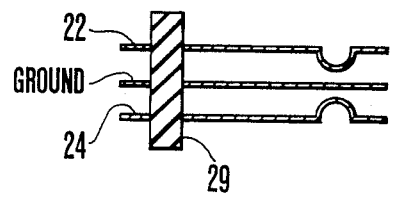
FIG. 2 is an illustration of arrangement of switches 22 and 24 which are included in FIG. 1.
Figure 3:
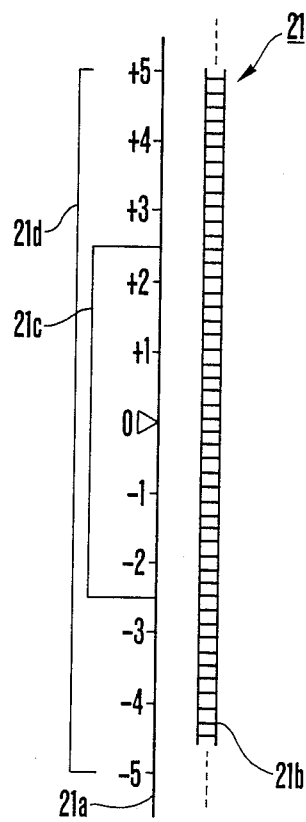
FIG. 3 is an illustration of a display device of the camera embodying this invention.

A real time extending circuit 17 is arranged to convert an APEX value Tv produced from the port PF of the MI-COM 8 into a shutter opening time. The circuit 17 supplies a shutter control circuit 18 with this converted value. The shutter control circuit 18 is arranged to operate in response to the trigger signal produced from the port PK of the MI-COM 8. After the lapse of a length of time required for aperture control by the aperture control circuit 14, the shutter control circuit 18 energizes a leading shutter curtain operating magnet 19 to have a leading shutter curtain allowed to travel. The shutter control circuit 18 is also arranged to perform a time counting operation on the basis of the shutter opening time information which is produced from the real time extending circuit 17. After the lapse of this length of time, the circuit 18 energizes a trailing shutter curtain operating magnet 20 to have a trailing shutter curtain allowed to travel to bring thereby an exposure to an end. The port PL of the MI-COM 8 is connected to a switch 28 which is arranged to be on when a series of mechanical charge units, consisting of an AE mechanism, a film winding mechanism, etc, are in a charge completed state. This switch 28 turns on upon completion of film winding and turns off upon completion of the travel of the trailing shutter curtain. The port PH of the MI-COM 8 is connected to five switches 22 to 26. The switch 22 is arranged to turn on in response to a first stroke operation on a shutter release button. A light measuring operation begins when the switch 22 turns on. There obtains a so-called AE lock condition as long as this switch 22 is on. Further, even after the switch 22 turns off, the light measuring operation arrangement is kept in an operative state until the lapse of a length of time set by the above-stated second timer. The switch 23 is a light measurement storing switch which is provided for exposure control according to an average value of light measured by a multiple light measuring operation or for exposure correction relative to a measured value of light. The switch 24 is a trigger switch for starting a sequence for exposure control operations of the camera and is arranged to turn on in response to a second stroke operation on the shutter release button. Referring to FIG. 2, a ground piece GROUND is interposed in between the switches 22 and 24, which are carried by an insulating holding member 29. When the switch 24 turns on, the other switch 22 also turns on. The switches 25 and 26 are provided respectively for high light control and shadow control. They are arranged to be used for applying exposure correction to an exposure value computed on the basis of a measured value of light. A second display device 27 is connected to the port PJ of the MI-COM 8. The second display device 27 displays Tv and Av values coming from the MI-COM 8. A first display device 21 consists of a display element array 21b and a scale 21a which are arranged to show a measured value of light as shown in FIG. 3. The display device 21 displays a difference between a measured value of light (an Ev value) and an Ev value representing a control exposure (a Tv+Av value) relatively to each other. The scale 21a is provided with a mark 21c indicating an area having linearity within an H-D curve (E-D curve) of a positive film, i.e. a reproducible range, and also a mark 21d indicating a reproducible range of a negative color film. These marks enables the photographer to make fine adjustment of high light and shadow control as desired according to them.

The operation of the camera arranged according to this invention as shown in FIG. 1 is as shown in the flowchart of FIGS. 5A to 5F. Before description of the whole sequence of operation of this embodiment shown in the flowchart of FIG. 5A, the control operations of embodiment according to various subroutines shown in the flowcharts of FIGS. 5B to 5F are described as follows:

Further, the operations indicated by the flow charts of FIGS. 5A to 5F are arranged to be carried out according to a micro program stored at the read-only memory (hereinafter referred to as ROM) of the MI-COM 8. The program is assumed to be carried out in regular sequence beginning with a step (1).

Light Measuring Routine (FIG. 5B):

This routine is shown as steps (41) to (43). At the step (42) of the light measuring routine, the output of the A/D converter 7 is detected. The output of the A/D converter 7, which is an Ev value obtained in the APEX system at the point of time, is supplied to a memory Evx. By this, a brightness value at that point of time is detected. The operation then goes back to the main routine. In short, this routine is carried out for the purpose of supplying a measured value of light obtained at the time of this routine to the memory Evx.

Computation Routine (FIG. 5C):

This routine is shown as at steps (44) to (48). At the step (45), the latest APEX value (Ev value), which is obtained and stored at the memory Evx through the light assuring routine and represents the brightness to be photographed, is supplied to a memory Evx(N). This memory Evx(N) is arbitrarily designated, among memories Evx(1) to Evx(l), according to a value indicated by a pointer N. The value of the pointer N is arranged to be increased one by one every time the light measuring routine is carried out in response to a depressing operation on the light measurement storing switch 23 as will be described later herein. Therefore, the Ev value which is obtained by a first performance of the light measuring routine is stored at the memory Evx(1). After that, Ev values obtained by the ensuing performances caused by the depressing operation on the switch 23 come to be stored at other memories Evx(2)—Evx(l) one after another.

After an Ev value is supplied to one of these memories designated by the pointer N at the step (45), a next step (46) is carried out. At the step (46), a total of the Ev values supplied to the memories Evx(1) to Evx(N) is obtained. The total or sum of the Ev values detected is thus obtained every time the switch 23 turns on. At a subsequent step (47), the sum of the Ev values obtained a the step (46) is divided by the value of the pointer N to obtain a value SUM/N. Then, a correction value ΔEv is subtracted from the value SUM/N to obtain a control exposure value Ev.

As mentioned above, the value of the pointer N increases every time the switch 23 is pushed down to cause one performance of the light measuring routine. Therefore, the above-stated value SUM/N is detected at the step (47) every time the switch 23 turns on to show an average value of the measured values of light. Then, the above-stated control exposure value Ev is obtained by subtracting a correction degree or value ΔEv from the average value. After that, the operation of the embodiment goes back to the main routine at another step (48).

Tv and Av Display Routine (FIG. 5D):

This routine is shown as steps (49) to (59). In this subroutine, the step (50) is first carried out. At the step (50), an instruction is produced to read out the condition of the mode setting circuit 11 from the port PD of the MI-COM 8 and thus to detect a mode in which the embodiment is set. In this specific embodiment, the mode setting circuit 11 consists of two switches which are arranged to operate in response to a mode selector which is not shown. Both the switches turn on when a shutter priority mode is selected at the mode selector. One of the two switches turns on while the other remains off when an aperture priority mode is selected. Both the switches are off when a program mode is selected. With the positions of these two switches detected, the set mode is detected at the step (50). The operation proceeds to a step (51) when the set mode is found to be the shutter priority mode. At the step (51), a shutter time value Tv, which is set in the APEX system by the Tv setting circuit 9, is supplied via the port PB to the MI-COM 8.

After that, at a step (54), the control exposure value Ev, which is obtained by the above-stated computation routine, and the set shutter time value Tv mentioned above are subjected to an APEX computation Av=Ev−Tv to obtain an aperture value Av.

Figure 7:
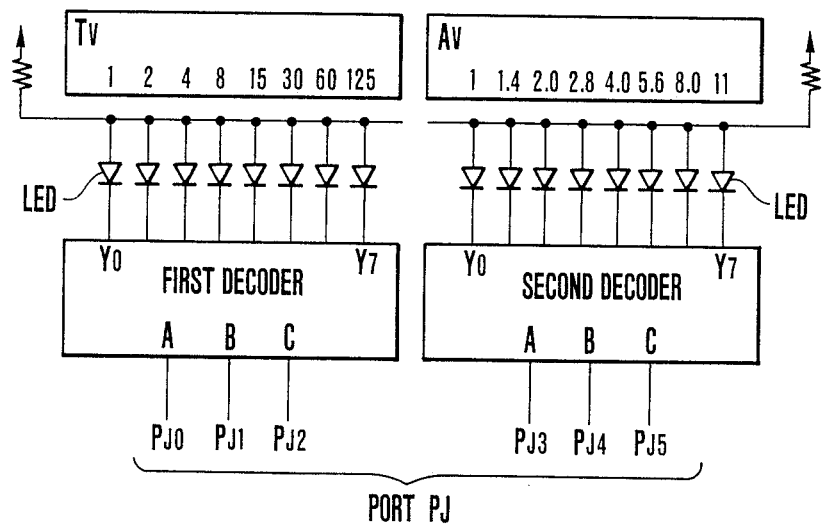
FIG. 7 is a circuit diagram showing, by way of example, the details of a display device 27 included in FIG. 1.

At the step (56), the values Tv and Av are transmitted via the port PJ of the MI-COM 8 to the second display device 27 which then displays the values Tv and Av. The second display device 27 is arranged, for example, as shown in FIG. 7. Referring to FIG. 7, display panels are provided with shutter time marks and aperture value marks. LED's are arranged to indicate applicable marks according to the above-stated values Tv and Av. This display arrangement of course may be replaced with a display arrangement of the seven-segment display type.

After the values Tv and Av are displayed in this manner at the step (56), steps (57) and (58) are carried out before the operation goes back to the main routine. At the step (57), the above-stated value Av is produced from the port PE of the MI-COM 8 and is transmitted to the D/A converter 12 to have the value Av converted into an analog value. At the step (58), the above-stated value Tv is transmitted via the port PF of the MI-COM 8 to the real time extending circuit 17. After the display of the values Tv and Av, the value Av is thus D/A converted and the value Tv is transmitted to the real time extending circuit 17.

While the embodiment operates in the manner as described above in the case of the shutter priority mode, the embodiment operates as follows in the event of the aperture priority mode: With the aperture priority mode selected at the step (50), a step (52) is carried out instead of the step (51). At this step (52), information on a preset aperture value is taken out from the Av setting circuit 10 and is supplied via the port PC to the MI-COM 8. At another step (55), the preset aperture value Av thus obtained and the control exposure value Ev are subjected to a computing operation Tv=Ev−Av to obtain thereby a shutter time value Tv. Following this computation, the above-stated steps (56) to (59) are carried out. In other words, the values Tv and Av are displayed; the value Av is D/A converted; and the value Tv is transmitted to the real time extending circuit 17.

In case that the program mode is selected at the step (50), a step (53) is carried out. At the step (53), an aperture value Av is obtained by selecting a given value Av out of an Av table stored at the ROM on the basis of the control exposure value Ev. Following that, the above-stated steps (55) to (58) are carried out to compute a value Tv and to have the values Av and Tv displayed. Then, the operation goes back to the main routine at the step (59).

Ev Display Routine (FIG. 5E):

This routine is shown as steps (60) to (83). In the Ev display routine, the step (61) is first carried out. At the step (61), a memory MEM(Ev) is cleared and the content of this memory MEM(Ev) is sent out from the port PG of the MI-COM 8. Since the memory MEM(Ev) is cleared as mentioned above, all the bits of a signal produced from the port PG are zero. As a result of this, all the LED display array 21b of the first display device 21 extinguish. At a next step (62), a discrimination is made as to whether the value of the pointer N coincides with the value of a pointer $N_{OLD}$. If the result of this is $N=N_{OLD}$, the operation proceeds to a step (63), at which a loop counter K is set at "1". Then, an ensuing step (64) is carried out. At this step (64), a difference DIFEv between the control exposure value Ev and the content of a memory designated, among the above-stated memories Evx(1) to Evx(l), by the set value of the counter K.

Since the value of the counter K is "1" as mentioned above in this instance, the memory Evx(1) is designated. Therefore, a difference DIFev is obtained between the content of the memory Evx(1) and the control exposure value Ev.

At a step (65) a given one of the bits of the memory MEM(Ev) corresponding to the difference DIFEv obtained at the step (64) is set. The content of the memory MEM(Ev) is transmitted via the port PG of the MI-COM 8 to the first display device 21. Then, one of the LED display array 21b of the display device 21 corresponding to the set bit of the memory MEM(Ev) is selectively lighted.

At a next step (66), an increment of the content of the counter K takes place to make it K=2. At an ensuing step (67), this value of the counter K is compared with the value of the point N. Then, if K>N, the operation proceeds to a step (68). If K≦N, the operation goes back to the step (64) to repeat the processes of the steps (64) to (67) until there obtains the condition of K>N.

Accordingly, the steps (64) to (67) are carried out only once if the value of the pointer N is "1" and the difference between the content of the memory Evx(1) and the control exposure value Ev is displayed at the display device 21. Further, in case that the value of the pointer N is "1" and the value of the correction degree ΔEv is zero, the content of the memory Evx(1) and the control exposure value Ev are identical with each other as will be further described later. In that instance, therefore, an LED, which among the LED display array 21b indicates a graduation "0" of the scale lights. If the correction degree ΔEv is not zero while the value of the pointer N is "1", the operation becomes as follows: The control exposure value Ev, which is obtained through the above-stated computation routine, and the measured light value Evx, which is obtained through the light measuring routine and is stored at the memory Evx(1), are in the relation of Ev=Evx−ΔEv. Therefore, the difference DIFEv, which is obtained at the step (64), can be expressed as Evx−Evx+ΔEv=ΔEv. Thus, one of the LED display array 21b which corresponds to the correction degree ΔEv lights. Therefore, in case that the set correction degree ΔEv is +one step, an LED which, among the LED array, indicates a graduation "+1" lights up at the display device 21. Further, if the value of the pointer N is not 1, that is, in the event that the light measurement storing switch 23 is pushed down a plurality of times and, as a result, measured light values obtained through the light measuring routine carried out in response to the repeated operation on the switch 23 are stored at the memories Evx(1) to Evx(l), the embodiment operates as follows: An LED of the display LED array 21b, which corresponds to a difference between the measured light value of the memory Evx(1) and the control exposure value Ev, lights in response to the instruction of the first round of the steps (64) to (66). Then, in response to the second round of steps (64) to (66), another LED, which corresponds to a difference between the measured light value stored at the memory Evx(2) and the control exposure value Ev lights up. Following this, an LED, corresponding to the difference between the control exposure value Ev and the measured light values stored at each of the subsequent memories Evx(3) to Evx(l), lights one after another until there obtains the condition of K>N.

The further details of the above-described display operation are as follow:

Let us assume that the light measuring routine is carried out twice and that the measured light value Evx obtained by the first round of performance of the routine is Ev=7 and the value obtained by the second is Ev=11. In this instance, the value Ev=7 is stored at the memory Evx(1) add the other value Ev=11 by the memory Evx(2). Further, in this instance, the control exposure value Ev obtained by the above-stated computation routine is as follows: Since the value of the pointer N is 2, the computing operations performed at the steps (46) and (47) become $$SUM = \sum_{K=1}^{2} Evx(K) = Evx(1) + Evx(2) = 7 + 11 = 18,$$

and $$Ev = \frac{SUM}{N} - \Delta Ev = \frac{18}{2} - \Delta Ev.$$

Then, assuming that the correction degree $\Delta Ev$ is set at a value $\Delta Ev = +1$, for example, the control exposure value Ev obtained by the above-stated computation becomes $18/2 - 1 = 8$. The difference DIFEv obtained by the first round of performance of the steps (64) to (66), therefore, becomes $Evx(1) - Ev = 7 - 8 = -1$. The difference DIFEv obtained by the second round of the steps (64) to (66) becomes $Evx(2) - Ev = 11 - 8 = 3$. As a result, at the display device 21, one of the LED's of the display LED array 21b which points to a graduation "−1" of the scale 21a first lights up according to the difference DIFEv = −1 between the measured light value obtained by the first performance and the above-stated control exposure value. Then, while this LED remains lit, another of the LED's of the display LED array 21b, which points to a graduation "3" of the scale 21a, lights up according to a difference DIFEv = 3 between the measured light value obtained by the second performance and the control exposure value. By this display operation, the relative position of the measured light value obtained by each round of performance is thus displayed in relation to the control exposure value.

After completion of the display operation of the display device 21, the embodiment proceeds to a next step (68). At the step (68) the content of the memory ΔEvOLD is caused to coincide with the above-stated correction degree $\Delta Ev$. Then, the operation of the embodiment comes back to the main routine.

The operation of the embodiment is performed in the manner as described in the foregoing in case that the value of the pointer N coincides with that of the pointer $N_{OLD}$. If the value of the pointer N differs from that of the pointer $N_{OLD}$, the embodiment operates in the following manner:

The value of the pointer N and that of the pointer $N_{OLD}$ become different from each other in the event of an additional performance of light measurement prior to the Ev value display routine. In this instance, a step (70) is carried out after the step (62). At this step (70), a computation $$SUM_{OLD} = \sum_{K=1}^{N_{OLD}} Evx(K)$$

is performed. The value of the pointer $N_{OLD}$ is the number of light measuring performances less one as will be further described later. This value thus indicates how many times the light measuring operation is performed before a new light measuring performance.

Accordingly, the above-stated value $SUM_{OLD}$ is indicative of the sum of measured light values which are obtained by the light measuring performances before a new light measuring performance (light measurement performed for an A-th time) and are stored at the memories Evx(1) to Evx(A−1). After completion of this computation, the embodiment proceeds to a step (71) to perform a computation $$E_{VOLD} = \frac{SUM_{OLD}}{N_{OLD}} - \Delta E_{VOLD}.$$

The value of $$\frac{SUM_{OLD}}{N_{OLD}}$$

is obtained by dividing the sum of the previous light measurement values by the number of the previous light measuring performances. It, therefore, indicates the average value of light values measured until immediately before the new performance of the light measuring operation. The value $\Delta E_{VOLD}$ indicates a correction degree obtained up to that time. Therefore, the value $E_{VOLD}$ indicates a control exposure value obtained before the new light measuring performance, that is, it indicates a control exposure value obtained with the light measuring operation performed A−1 times.

After the control exposure value $E_{VOLD}$ is obtained in this manner, the light measuring operation is newly performed at a step (72). Then, a control exposure value Ev, which is determined by a number of light measuring performances, including the A-th performance is obtained. This control exposure value Ev is compared with the previous control exposure value $E_{VOLD}$, which is obtained with the light measuring operation performed A−1 times, to determine which is larger or smaller. If the result of this is $Ev = E_{VOLD}$, the operation of the embodiment goes to a step (83) to bring the values of the pointers $N_{OLD}$ and N into agreement. The operation then goes back to the step (60). The Ev display routine is again carried out from the step (60). However, since the values of the pointers N and $N_{OLD}$ are in agreement this time, the steps (61) to (69) are carried out. Further, the display operation of the steps (61) to (69) is performed in the following manner as the light measuring operation is this time performed A times: A difference between each of light values measured by light measuring operation performed A−1 times and the control exposure value is first displayed. After that, the LED display array 21b additionally makes a display of a difference between the measured light value obtained by the A-th light measuring performance and the control exposure value.

In case that the result of comparison made at the step (72) is $Ev > E_{VOLD}$, the operation of the embodiment proceeds to a step (73). At the step (73), a predetermined amount STEP=0.1 is set. The display made by the display device 21 is turned off at a step (75). Then, the operation shifts to a step (76).

Figure 4:
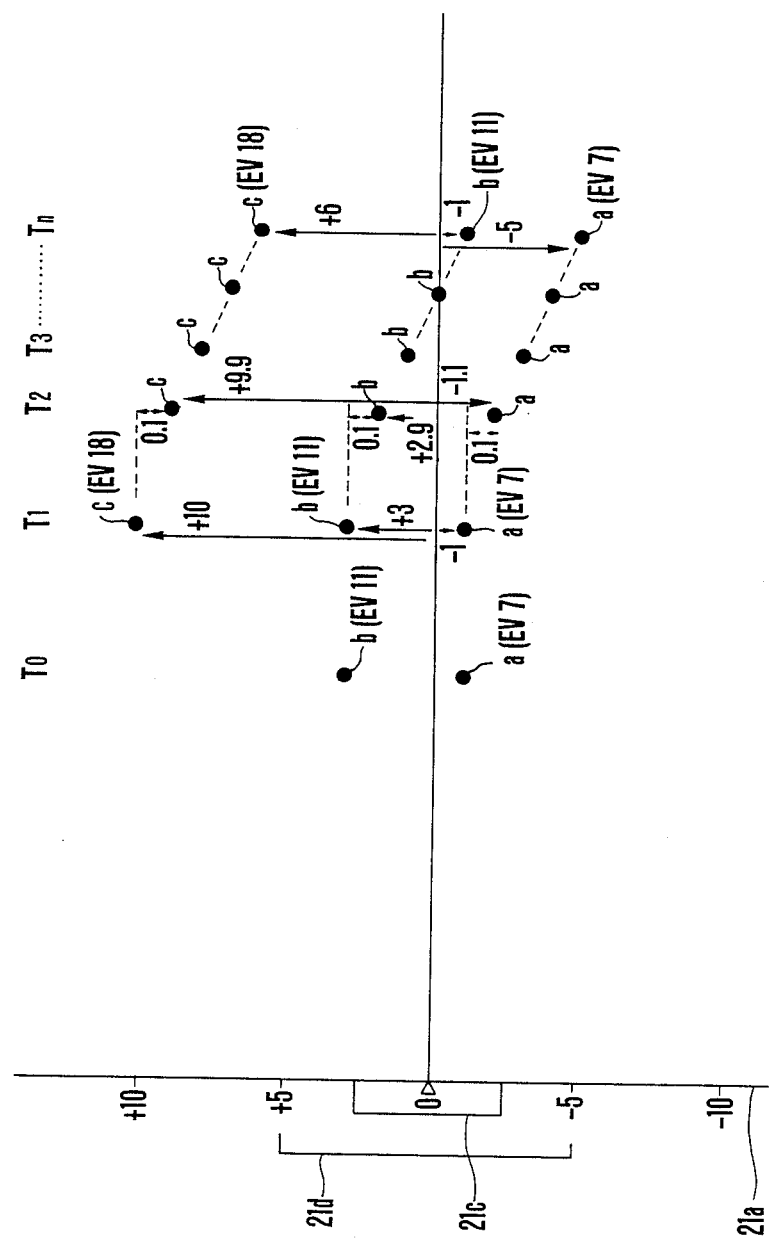
FIG. 4 is an illustration of the displaying state of the display device of FIG. 3, FIGS. 5A to 5F are flowchart showing the operation of the camera embodying this invention.

The flow of operation at steps (76) to (80) is similar to that of operation at the above-stated steps (63) to (67). A display operation is performed in the same manner as described in the foregoing for the steps (63) to (69). Further, the difference DIFEv obtained by the steps (76) to (80) is $DIFEv = Evx(K) - E_{VOLD}$. Therefore, with the light measuring operation performed A times, the display device 21 displays one after another the difference between each of the measured light values Evx obtained by the first to the A-th light measuring performances and the control exposure value $E_{VOLD}$ obtained by the operation performed up to A times less one. In other words: Let us assume that the light measuring operation is performed three times; the measured light value obtained by the first performance is Ev=7; the value obtained by the second is Ev=11; and the value obtained by the third is Ev=18. Further assuming that the control exposure value $E_{VOLD}$ obtained by the operation performed up to the second performance is Ev=8, a difference Ev=−1 between the first measured light value and the control exposure value $E_{VOLD}$ is first displayed on the display scale 21a as indicated in FIG. 4 at a time T1 and at a point "a". Following that, a difference Ev=+3 between the second measured light value and the control exposure value $E_{VOLD}$ is displayed as indicated at the time T1 and a point "b" in FIG. 4. Further, a difference Ev=+10 between the third measured light value and the control exposure value $E_{VOLD}$ is displayed as shown at the time T1 and a point "c" in FIG. 4.

The control exposure values obtained by the previous light measuring operation performed A−1 times and the measured light value obtained by each of the light measuring performances from the first to the A-th performance are thus displayed relatively to each other. After this relative display operation, the embodiment proceeds to a step (81) to have the above-stated predetermined amount STEP=0.1 added to the control exposure value $E_{VOLD}$. The control exposure value $E_{VOLD}$ is thus renewed and changed to an extent as much as Ev=0.1. Then, at a next step (82), a discrimination is performed as to whether the renewed control exposure value $E_{VOLD}$ is in agreement with the control exposure value Ev obtained by the light measuring operation performed up to this time (or from the first light measuring performance to the A-th performance). If the result of the discrimination is still not $E_{VOLD} = Ev$, the operation of the embodiment again goes back to the step (75) to make a display of the difference between the measured light value obtained by each light measuring performance and the control exposure value $E_{VOLD}$ previously obtained, that is, to make the relative display. Further, since the control exposure value $E_{VOLD}$ obtained this time is increased by +0.1 from the control exposure value $E_{VOLD}$ previously displayed, the above-stated display operation by the second round of the steps (75) to (80) is shifted by a 0.1 step. Therefore, the measured light values obtained by the light measuring performances are relatively displayed as indicated at points "a", "b" and "c" of time T2 in FIG. 4. Following this, the relative display of the measured light value obtained by each light measuring performance is shifted by 0.1 step at a time according as the control exposure value $E_{VOLD}$ is renewed and changed 0.1 step until there obtains the condition of $E_{VOLD} = Ev$. The further details of this display operation are as follows:

In the event that the light measuring operation is performed three times to obtain a measured light value Ev=7 by the first performance, a value Ev=11 by the second performance and a value Ev=18 by the third performance as mentioned in the foregoing, the control exposure value Ev obtained by the light measuring performances up to the third performance becomes $$\frac{7 + 11 + 18}{3} = 12$$

according to the computation routine described in the foregoing.

Therefore, the relation of the control exposure value to the measured light value obtained by each of the light measuring performances becomes visually observable with a difference between the measured light value of each of the first, second and third light measuring performances and the control exposure value Ev=12 which is obtained by the light measuring operation performed up to the third time arranged to be relatively displayed by the display device 21 as shown at a time Tn and points "a", "b" and "c" in FIG. 4. However, as shown at a time T0 in FIG. 4, the relative display (difference display) for each of the first and second measured light values and the control exposure value obtained by the operation up to the second performance includes only a point "a" which represents the first interrelation and a point "b" which represents the second interrelation. If this condition is shifted immediately to the relative display condition obtained this time (the time Tn in FIG. 4), it would be difficult to find out which of the points "a","b" and "c" is representing which of the performances of the light measuring operation.

To solve this problem, the embodiment is arranged to make relative displays of the control exposure value $E_{VOLD}$ which is obtained by the previous light measuring performances and the measured light values resulting from light measuring performances performed up to this time; and then the relative display of each measured value is gradually shifted to a display relative to the current control exposure value Ev.

In other words, referring to FIG. 4, the measured light values obtained by the light measuring operation up to the second light measuring performance and the control exposure value obtained by the light measuring operation up to the second performance are relatively displayed at the time T0; then measured light values obtained by the first, second and third light measuring performances and the control exposure value obtained by the first and second performances are relatively displayed as shown at the time T1; and, after that, at the points of time T3 to Tn, the relative value of each measured value is shifted by 0.1 step before it is displayed one after another until the measured light values obtained by the light measuring operation performed up to the third performance and the control exposure values obtained by the light measuring operation performed up to the third performance are relatively displayed at the time point Tn in FIG. 4. The display arrangement of the embodiment thus clearly shows the displacement of the relative values (points a, b and c) of measured light values.

The control exposure value $E_{VOLD}$ is shifted by 0.1 step at a time during the process of the above-stated displacement display of each measured light value. Therefore, when the displacement display process comes to an end as described above, there obtains the condition of $E_{VOLD}=Ev$. With this condition detected at the step (82), the operation of the embodiment proceeds to a step (83). At the step (83), the content of the pointer $N_{OLD}$ is brought into agreement with that of the pointer N and the operation again comes back to the step (60). Then, the steps subsequent to the step (60) are again carried out. However, since there obtains the condition of $N=N_{OLD}$ this time, the steps (60) to (69) are carried out to have the control exposure value obtained this time and each of the measured light values obtained by the light measuring performances up to this time are relatively displayed once again. The operation goes back to the main routine at the step (69).

The display showing the displacement of each measured light value is made when the condition of $Ev>E_{VOLD}$ is detected at the step (72). In the event of a condition $Ev<E_{VOLD}$, a step (74) is carried out in place of the step (73) and the above-stated predetermined amount or degree STEP is set at $-0.1$. Accordingly, in that instance, the control exposure value $E_{VOLD}$ is to be shifted by $-0.1$ step at a time. In that instance ($Ev<E_{VOLD}$), the variation or displacement of measured light values are also displayed in the same manner as in the case of $Ev>E_{VOLD}$.

Sequence Routine (FIG. 5F):

This routine consists of steps (84) to (88). At the step (85), the position of the switch 28 shown in FIG. 1 is detected via the port PL of the MI-COM 8. This switch 28 is arranged to be on when the mechanical charge system, including the film feeding mechanism, the shutter mechanism, etc., is in a completely charged state. The operation of the embodiment shifts to the step (88) and then back to the step (1) in the event that the switch 28 is off.

Figure 8A:
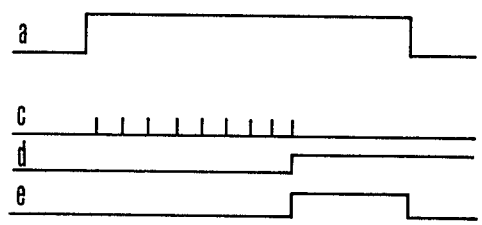
FIG. 8A is an illustration of the operation of an aperture control circuit included in FIG. 1.
Figure 8B:
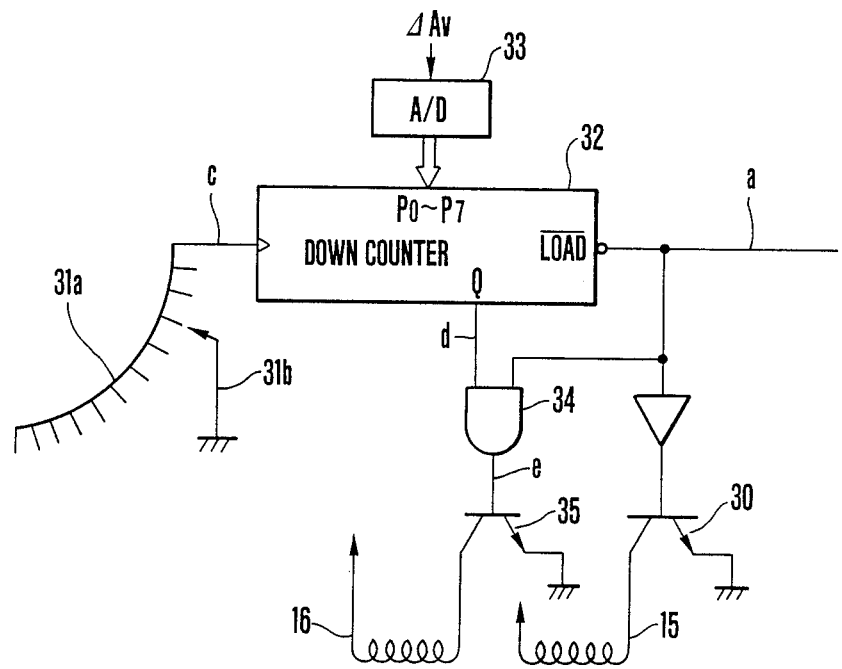
FIG. 8B is a diagram showing the details of the aperture control circuit.

The operation proceeds to the step (86) if the switch 28 is on. At the step (86), a trigger signal (a signal "a" shown in FIG. 8A) is produced from the port PK of the MI-COM 8 and is supplied to the aperture control circuit 14. The aperture control circuit 14 is arranged as shown in FIG. 8B. Referring to FIG. 8B, a transistor 30 turns on in response to the above-stated trigger signal. This causes a start magnet 15 to operate. The magnet 15 actuates an aperture control member which is not shown. The aperture control member, in turn, actuates an aperture defining member. The displacement of the aperture defining member is detected by a comb pattern 31a and a contact piece 31b which operate in association with the aperture defining member. The comb pattern 31a and the contact piece 31b generate a pulse signal "c" according to the extent of the displacement, as shown in FIG. 8A. A down counter 32 is arranged to become operative in response to the above-stated trigger signal "a" and to perform a down counting operation in synchronism with the pulse signal.

An A/D converter 33 is arranged to convert into a digital value an exponential aperture value $\Delta Av$ produced from the differential circuit 13. This digital value is preset at the down counter 32. The down counter 32 subtracts a digital value corresponding to the aperture value $\Delta Av$ by the above-stated down counting operation. When the aperture is stopped down to an extent corresponding to the exponential aperture value $\Delta Av$, a carry signal, which is represented by a signal "d" in FIG. 8A, is produced from the terminal Q of the down counter 32. This causes an AND gate 34 to produce an output, as represented by a signal "e" in FIG. 8A. The signal "e" turns a transistor 35 on to render a stop magnet 16 operative. The stop magnet 16 then brings the movement of the aperture defining member to a stop to end aperture control.

Figure 9A:
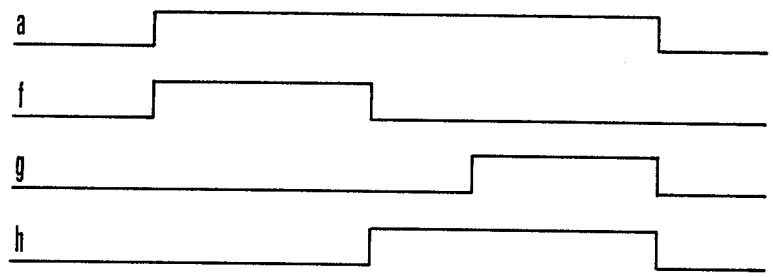
FIG. 9A is an illustration of the operation of a shutter control circuit included in FIG. 1.
Figure 9B:
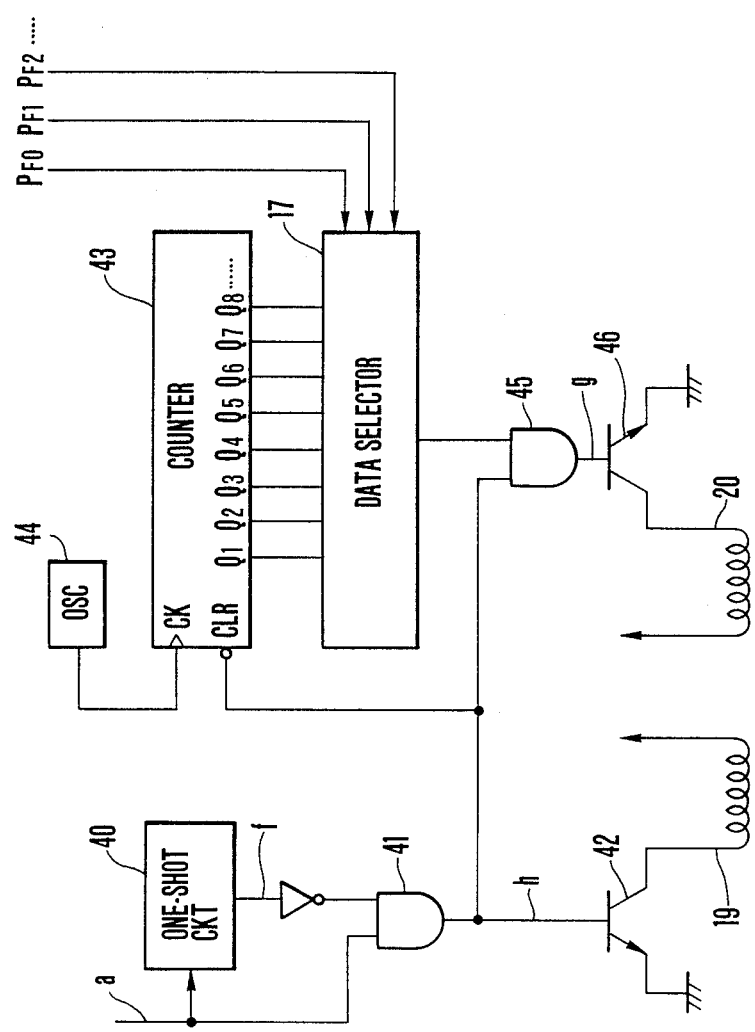
FIG. 9B is circuit diagram showing the details of the arrangement of the same shutter control circuit.

Meanwhile the trigger signal from the port PK of the MI-COM 8 is transmitted to the shutter control circuit 18. The shutter control circuit 18 is arranged as shown in FIG. 9B. The circuit 18 includes a one-shot circuit 40 which comes to operate in response to the above-stated trigger signal (represented by a signal "a" in FIG. 9A). The one-shot circuit 40 then produces a one-shot pulse as represented by a signal "f" in FIG. 9A. The time of this pulse corresponds to a maximum period of time required for aperture control by the above-stated aperture control circuit 14. After completion of the aperture control, therefore, an AND gate 41 produces an output as represented by a signal "h" in FIG. 9A. The signal "h" turns a transistor 42 on. With the transistor 42 turned on, the leading shutter curtain operating magnet 19 operates to cause the leading shutter curtain to travel. An exposure begins.

The real time extending circuit 17, serving as a data selector, receives information on the shutter time value Tv from the port PF of the MI-COM 8 and selects an applicable output terminal of a binary counter 43 on the basis of this value Tv. Further, the output of the above-stated AND gate 41 is received at the control terminal of the counter 43. In response to the output of the AND gate 41, the counter 43 becomes operative and begins to count reference clock pulses produced from a pulse generator 44 (or oscillator). After a predetermined number of pulses, determined according to the shutter value Tv, are counted, the counter 43 produces an output from the above-stated selected output terminal. This output is supplied to an AND gate 45. This AND gate 45 produces an output as represented by a signal "g" in FIG. 9A. This signal "g" turns on a transistor 46. The transistor 46 then actuates the trailing shutter curtain operating magnet 20. The magnet 20 causes the trailing shutter curtain to travel to bring thereby the exposure to an end.

The trailing shutter curtain comes to be in a travelled state upon completion of the exposure control operation. Therefore, after completion of the exposure control, the mechanical charge system comes to be in a discharged state and the switch 28 turns off. Therefore, when the switch 28 is detected by the detecting action to be off at the step (87), the operation of the embodiment shifts to the step (88) and then returns to the step (1) for the main in routine.

Figure 5A:
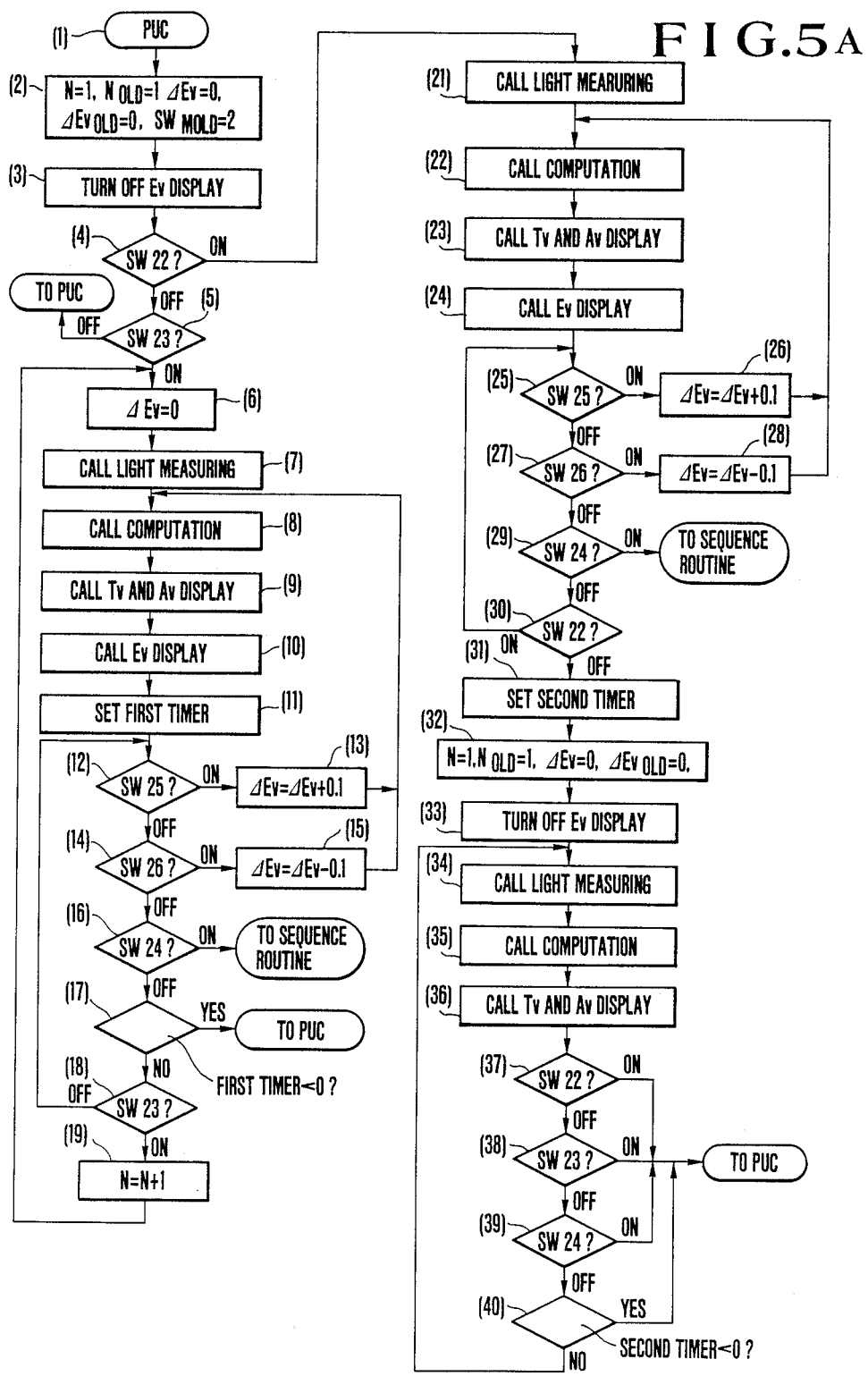
Figure 5E:
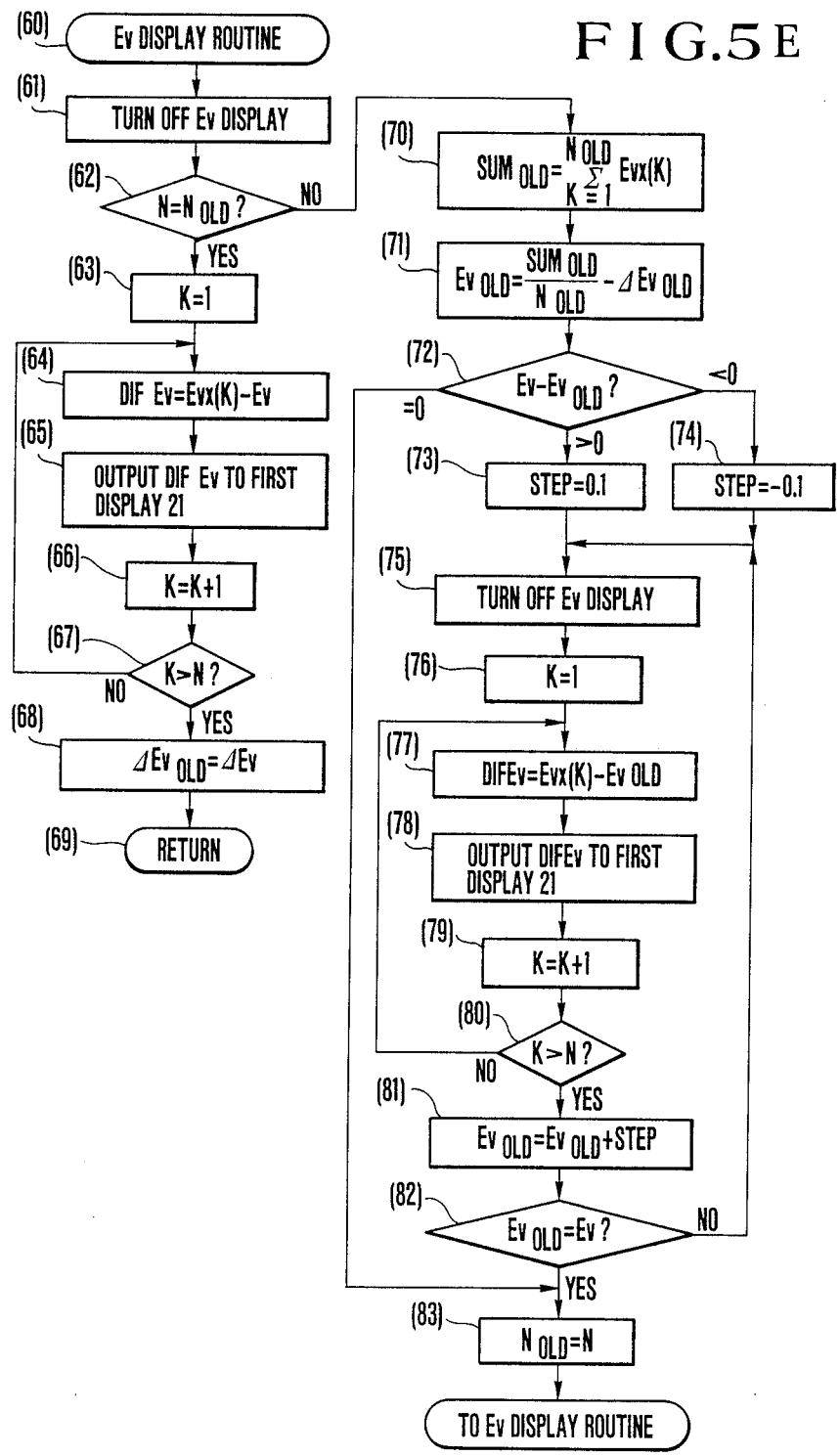

Referring now to FIG. 5A which shows the main routine, the overall operation of the camera according to this invention is as described below:

When a power supply (not shown) is switched on, the MI-COM 8 becomes operative. A program incorporated in the MI-COM 8 starts. The operation begins from the step (1). At the step (1) of this program, a PUC (power-up clear) instruction is produced. Registers, etc., included in the MI-COM 8 are first initialized. Following this, the operation proceeds to a step (2). At the step (2), a pointer N, which is arranged to indicate how many results of performances of a multi-photometric operation are stored within the MI-COM 8, is initialized. At the same time, a register, which is arranged to set exposure correction degrees $\Delta Ev$ and $\Delta Ev_{OLD}$ for high light control, and shadow control is also initialized. At a next step (3), a display-off signal is applied via the port PG to the display device 21. This signal initializes the display device 21 by turning off the display of the display device 21. At a step (4), the position of a switch 22 disposed at the port PH is detected. If the switch is found on, the operation jumps to a step (21) for an AE lock process. If the switch 22 is found off, the operation proceeds to a next step (5). At the step (5), the position of another switch 23, which is connected to the port PH of the MI-COM 8, is detected. If the switch 23 is found off, the operation returns to the step (1). If the switch 23 is found on, the operation proceeds to a step (6) which is for a light measuring process. At these steps (1) to (5), the registers, etc., of the MI-COM 8 are thus initialized and the positions of the switches 22 and 23 are detected. These steps are repeated until either of the switches 22 and 23 turns on.

The switch 22 is arranged to be turned on by the first stroke of a release button. The switch 23 is provided for storing the results of light measurement. Therefore, the steps (1) to (5) are repeatedly carried out until the release button and a light measurement storing button are pushed.

Let us assume that the switch 23 turns on when the light measurement storing button, which is not shown, is pushed down for the purpose of carrying out a multi-photometric operation (or a multiple light measuring operation). Under this condition, the switch 23 is detected to be on at the step (5). Therefore, the operation proceeds to the next step (6) instead of returning to the step (1). This step (6) is provided for adjusting the exposure correction degree $\Delta Ev$ to zero. With the exposure correction degree thus becoming zero, the operation proceeds to a step (7). The step (7) is provided for reading the result of the light measuring routine consisting of the steps (41) to (43). Therefore, the steps (41) to (43) are carried out and a measured light value thus obtained is supplied to a memory Evx. After the light measuring routine, the operation of the program shifts to a step (8).

At the step (8), the result of the above-stated steps (44) to (48) of the computation routine is read out. In the computation routine, as described in the foregoing, the measured light value obtained by the light measuring routine is supplied to the memory Evx(N) designated by the pointer N. Then, a computed average of the measured light values stored at the memories Evx(1) to Evx(n) is obtained. Further, the control exposure value Ev is obtained by subtracting a correction degree $\Delta Ev$ from the average value. As mentioned in the foregoing, the value of the pointer N is 1 when the light measuring switch 23 is turned on for the first time while the correction degree $\Delta Ev$ is set at 0 at the step (6). In this instance, therefore, the measured light value obtained by the light measuring routine becomes the control exposure value as it is without any change.

The operation then shifts to a step (.9) to have the Tv and Av display routine of the above-stated steps :(49) to (59) carried out. In this display routine, a shutter time value Tv, an aperture value Av or both the values Av and Tv are determined on the basis of the above-stated control exposure value according to an operation mode selected. The determined values Tv and Av are displayed by the display device 27. Then, the value Av is supplied to the D/A converter 12 and th value Tv to the real time extending circuit 17, respectively.

At a step (10), the Ev display routine, which consists of the steps (60) to (69) mentioned in the foregoing, is carried out. Since the pointers N and $N_{OLD}$ are set at the value 1 as mentioned in the foregoing, the operation returns to the main routine after completion of only one round of performance of the steps (60) to (69) of the Ev display routine.

Further, as mentioned in the foregoing, the control exposure value Ev is in agreement with the measured light value which is obtained by the light measuring routine and is stored at the memory Evx(1). Therefore, the difference DIFEv obtained at the step (64) becomes zero. Accordingly, in the Ev display routine, one of the display LED array 21b of the display device 21 then comes to lights up to indicate the graduation mark "0" of the scale 21a which is shown in FIG. 3.

The operation then proceeds to a step (11) to set a first timer incorporated in the MI-COM 8. The instant it is set, the first timer begins to count time. Further, with the first timer set at the step (11), the operation of the program shifts to a next step (12) to detect the position of a switch 25. This switch 25 is a correction switch for high light control and is arranged to turn on in response to a depressing operation on a high light button which is not shown. If this switch 25 is found on indicating selection of the high light control mode, the operation shifts to a step (13).

At the step (13), a computation of $\Delta Ev = \Delta Ev + 0.1$ is carried out. By this, 0.1 step value of the Ev value is added to the correction degree $\Delta Ev$. The step (13) is thus provided for the purpose of increasing the correction degree $\Delta Ev$ by 0.1 step.

With the correction degree $\Delta Ev$ which has been set at zero now set at 0.1 at this step, the operation return to the step (8). Then, the steps (8) to (10) are again carried out. The control exposure value Ev obtained by the steps (8) to (10) this time thus becomes a value obtained by subtracting 0.1 from the measured light value obtained by the light measuring routine and supplied to the memory Evx(1). In other words, the control exposure value which is previously obtained is shifted down by 0.1 step. Then, the display device 27 displays values Av and Tv which are obtained on the basis of the control exposure value shifted down by 0.1 step.

Further, assuming that the measured light value of the memory Evx(1) is Evl, since the control exposure value Ev is shifted down by 0.1 step as mentioned above to become $Ev = Evl - 0.1$, the difference DIFEv obtained at the step (64) becomes $DIFEv = Evl - Evl + 0.1 = 0.1$. At the display device 21, therefore, an LED of the display LED array 21b which is arranged to indicate a graduation 0.1 of the scale 21a comes to light up. This display indicates that the control exposure value will be an under exposure by 0.1 seep for the measured light value. After that, the steps (8) to (13) are repeatedly carried out as long as the switch 25 remains on. Then, the index value at the scale 21a increases stepwise at the rate of 0.1 step in such a manner as 0.2, 0.3,—while the relation of the control exposure value to the measured light value is being displayed by the display device 21.

For example, in case that the color of an object to be photographed is pure white and the measured light value is Ev=7, the object cannot be reproduced in the pure white state with fidelity in a picture if the picture is taken with the control exposure value set at Ev=7. However, the pure white object can be reproduced with fidelity by the above-described operation of the embodiment, wherein: The switch 25 is turned on. The control exposure value in relation to the measured light value is gradually shifted while watching the scale 21a. Then, the control exposure value is changed from the value Ev=7, for example, to a value Ev=4.5 by turning the switch 25 off when one of the LED's of the display LED array 21b which is arranged to indicate a graduation mark or index +2.5 of the scale 21a comes to light up. Further, the scale 21a is provided with a mark 21c which represents a reproducible range for positive slide films. Therefore, in correcting the control exposure value, the correcting operation can be accomplished while confirming the relation thereof to the reproducible range. Further, in cases where the switch 25 is not on or where the position of the switch 25 is changed from an on position to an off position with a depressing operation on the high light control button stopped halfway, the switch 25 is detected to be off at the step (12) and the programed operation shifts to a step (14). This step (14) is for detecting the position of another switch 26. The switch 26 is arranged to turn on in response to a depressing operation performed on the shadow control button. The operation shifts from the step (14) to another step (15) when the shadow control button is pushed down for the purpose of performing shadow control. The step (15) is provided for decreasing the correction degree $\Delta Ev$ by 0.1 step. With the correction degree $\Delta Ev$ decreased by 0.1 step at the step (15), the operation again comes to the step (8). Then, the steps (8) to (12), (14) and (15) are repeatedly carried out as long as the switch 26 remains on. Therefore, in the event that the switch 26 is on, the control exposure value in relation to the measured light value gradually increases by 0.1 step at a time in a manner reverse to the case where the switch 25 is on. The scale of the display device 21 then indicates this.

Further, in cases where the shadow control button is not pushed down or where the button is released from the depressing operation thereon, the switch 26 turns off. Therefore, with this condition detected at the step (14), the programed operation shifts to a step (16). The step (16) is provided for detecting the position of the switch 24. At this step, if the shutter release button is pushed down to the second stroke of the operation, the programed operation shifts to the sequence routine which consists of the steps (84) to (88) as described in the foregoing. Then, an exposure control operation is accomplished on the basis of the control exposure value. In case that the shutter release button is not pushed down to the second stroke, the programed operation proceeds to a step (17). At the step (17), a detecting action is performed to find whether or not a predetermined length of time has been counted by the first timer mentioned in the foregoing. In the event that neither of the high light and shadow control buttons is operated nor the second stroke operation on the shutter release button is performed before the lapse of a predetermined period of time (several minutes) after the first timer is set at the step (11), the operation returns to the step (1). Therefore, in the event that no button is operated during the predetermined period after the light measurement storing button is pushed down once, the above-stated measured light value, etc., are cancelled.

Further, with the operation returning to the step (1), the steps up to the step (5) are repeatedly performed as mentioned in the foregoing. Therefore, the display made at the display device 21 is also turned off. This arrangement prevents the electric energy from being wasted as the display by the display device 21 comes to turn off even if the light measurement storing button is left in a depressed state after it is pushed down once.

Figure 6:
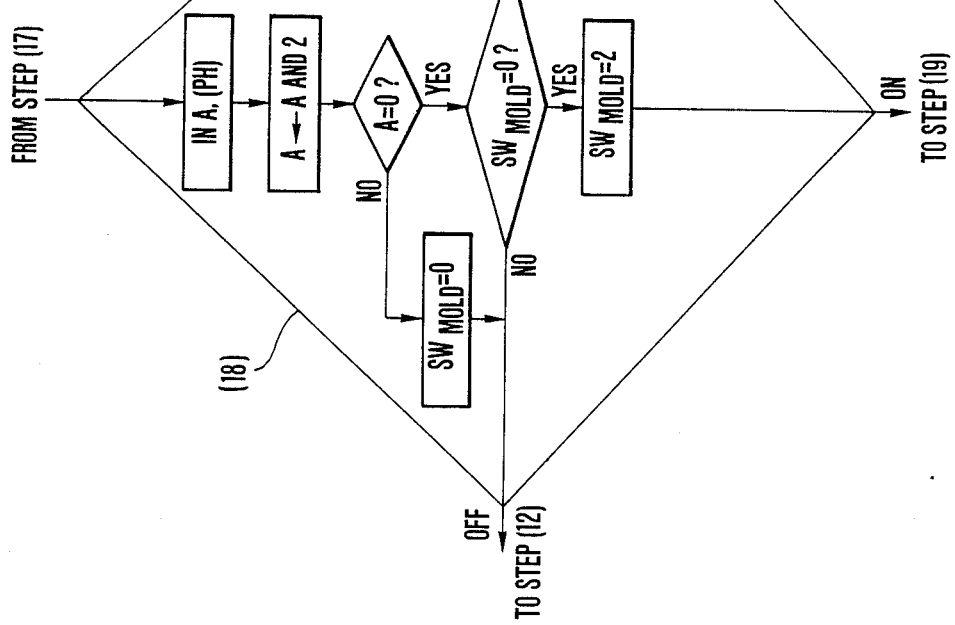
FIG. 6 is a flowchart showing a specific example of a part of the flowchart of FIG. 5A.
Figure 5F:
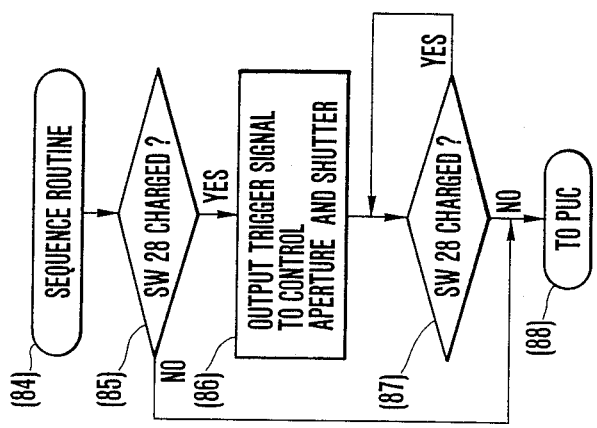

At the above-stated step (17), if it is detected that the first timer has not completed counting the predetermined length of time, the programed operation shifts to a step (18) to detect whether the switch 23 has been again turned on. The details of the step (18) are as shown in FIG. 6. First, the condition of the port PH is read into an accumulator. An AND of this condition and "2" is obtained. The above-stated switch 23 is arranged to give information on the second bit of the output of the port PH as shown in FIG. 1. The second bit is "0" when the switch 23 is on and is "1" when the switch 23 is off. The detecting action of the step (18) as to whether the second bit is "1" or "0" is performed by obtaining the AND of information on the condition of the port PH supplied to the accumulator and "2" (a signal having "1" only at its second bit). If the AND is obtained as a result of this AND taking process, the switch 23 is detected to be off with the second bit set at "1". In the event that the AND is not obtained, the switch 23 is judged to be on.

Assuming that the switch 23 is off, the operation of the program again comes to the step (12) after information at a memory $SW_{MOLD}$ is set at "0".

Therefore, as long as the light measurement storing button is not pushed, the steps (12) to (18) or (8) to (18) are repeatedly carried out as mentioned above.

If the switch 23 is judged to be on through the above-stated detecting process, a detecting action is performed to find whether the set value of the memory $SW_{MOLD}$ is "0". In its initial state at the step (2), the memory $SW_{MOLD}$ is set at "2". Therefore, if the switch 23 continuously remains on after the step (5), the memory $SW_{MOLD}$ is detected as having been set at "2" and the operation shifts to the step (12). In the event that the switch 23 is once turned off after the step (5), the memory $SW_{MOLD}$ is set at "0" as mentioned in the foregoing. In that event, therefore, the switch 23 stays off after the step (5). Then, when it again turns on, the memory $SW_{MOLD}$ is detected as to have been set at "0". Following that, when the memory $SW_{MOLD}$ is set at "2", the operation shifts to a step (19).

In other words, in the program of FIG. 6, a discrimination is accomplished between a case where the light measurement storing button is continuously pushed and another case where the button is once released from the state of being pushed and is again pushed down. Then, the operation is arranged to proceed to the step (19) only when the button is again pushed down. With the light measurement storing button again pushed down, the step (19) is carried out to effect an increment in the value of the pointer N as mentioned in the foregoing.

After that, the operation again shifts to the step (6). Again the steps (6) to (18) are carried out.

With the light measurement storing button pushed for the second time, a second measured light value is stored at the memory Evx(2) through the steps (7) and (8). Then, a control exposure value Ev resulting from the light measuring operation performed up to the second performance thereof, i.e. an average of the first and second light measuring performances, is obtained. This value Ev is read out at the step (10) through the Ev display routine. As mentioned in the foregoing, an increment is effected in the value of the pointer N when the light measurement storing button is pushed down. As a result of that, there no longer obtains a condition of $N=N_{OLD}$. In the Ev display routine, therefore, the steps (60) to (69) are carried out after the steps (70) to (83). The operation then returns to the main routine.

As mentioned in the foregoing, a difference between the control exposure value obtained by the previous round (the first performance) and the measured light value obtained by the ensuing round (or the second performance) is first displayed. After this, the display device makes a display of a difference between a control exposure value and a measured light value obtained by each ensuing light measuring performance with the difference shifted by 0.1 step.

Thus, a difference between a measured light value obtained by each light measuring performance and a control exposure value obtained up to that time is displayed with the difference being shifted by 0.1 step each time. Therefore, in the event of a multi-photometric operation, the relation of the measured light value of each light measuring performance to the control exposure value can be clearly confirmed from the display.

In the operation described, the steps (6) and (7) are carried out after the step (5) with the switch 23 turned on. In other words, the step (8) and steps ensuing it are carried out after light measurement. However, in case that the time counting operation of the first timer has not been completed, the photo-taking operation of the camera does not begin with the switch 24 turned on and the steps (12) to (18) or steps (8) to (18) are repeatedly performed. Therefore, although the photo-taking operation begins with the switch 24 turned on after the switch 23 is once turned on, the steps (21) to (40) are never performed even through the switch 22 is turned on until completion of the time counting operation of the first timer. In other words, a new output of the light measuring circuit is never caused to be stored by the first stroke of an operation performed on the shutter release button.

The embodiment operates as described above when the light measurement storing button is pushed down. In case that the shutter release button is pushed without pushing the light measurement storing button, the embodiment operates as follows:

In this instance, at the step (4), the position of the switch 22, which is arranged to turn on in response to the first stroke of the operation on the shutter release button, is detected. Therefore, the operation shifts from the step (4) to a step (21). The operation at the further steps (21) to (29) is identical with the steps (7) to (16). Therefore, at these steps, a control exposure value is obtained on the basis of a measured light value obtained at the time when the first stroke of operation is performed on the shutter release button. Further, in case that the switch 25 or 26 is operated in this instance for shadow control or high light control, the display device 21 displays a difference between the measured light value and a control exposure value which is corrected for the shadow or high light control. Further, if these switches 25 and 26 are not operated, one of LED's of the display LED array 21b lights up to indicate the zero mark of the scale 21a at the display device 21. The value Tv or Av is obtained on the basis of the control exposure value according to the selected priority mode and is displayed at the display device 27.

When the second stroke of operation is performed on the shutter release button while each of the above-stated displays is made, the switch 24 is detected to be on at the step (29). Then, the sequence routine is carried out to have the above-stated exposure control accomplished on the basis of the control exposure value.

At a step (30), the position of the switch 22 is detected. Since the above-stated steps (25) to (29) are arranged to be repeatedly performed as long as the switch 22 is on, if the shutter release button is kept under the first stroke operation after the first stroke operation is performed thereon, the above-stated display operation is continuously performed on the basis of the measured light value obtained when the first stroke operation is performed on the shutter release button.

In other words, in the operation described above, the step (21) is performed when the switch 22 is turned on. The step (22) and steps subsequent thereto are carried out after light measurement is performed. However, as long as the switch 22 continuously remains on, either the steps (25) to (30) or the steps (22) to (30) are repeated. Therefore, with the switch 22 turned on, the steps (6) to (19) are not carried out even when the switch 23 is turned on until the switch 22 is turned off. The arrangement is such that, a new output of the light measuring circuit is never caused to be stored by the operation of the light measurement storing switch 23 performed for multiple light measurement.

Further, in case that the shutter release button is released from the first stroke operation performed thereon without performing the second stroke operation after the first stroke operation, the switch 22 is detected to have turned off at the step (30). Then, the operation proceeds to a step (31). At the step (31), a second timer is set. At steps (32) and (33), the pointers N and $N_{OLD}$ and the correction degrees $\Delta Ev$ and $\Delta E_{VOLD}$ are set in their initial states; and the display at the display device 21 is turned off. Following this, steps (34) to (40) are performed. Then, if a time counting period defined by the second timer has not lapsed as yet after the release button is released from the operation thereon, the light measuring routine, the computation routine and the Tv and Av display routine are repeated to have the values Ev and Av displayed on the basis of a measured light value obtained in a real time manner. This arrangement, therefore, enables the photographer to set a new value Tv or Av or to change the selected priority mode during this operation.

Further, in case that the operation on the release button or on the light measurement storing button or the time counting operation of the second timer comes to an end while the steps (34) to (40) are repeatedly performed, the operation shifts to the step (1) and the program is again carried out.

Figure 11:
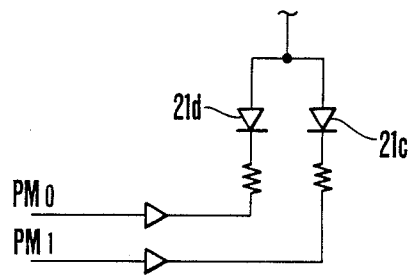
FIG. 11 is a diagram showing a drive circuit arranged to have mark parts 21c and 21d of a scale 21a of FIG. 3 composed of LED's and to drive the LED's.

In the specific embodiment described, as shown in FIG. 3, the scale 21a of the display device 21 is provided with a mark 21c which indicates the linearity range obtainable for a positive film and a mark 21d which indicates that of a negative film. These ranges or areas are arranged to be constantly on display. In another embodiment of this invention, the latitude of the film in use is read out from information on a DX code provided on the cartridge of the film; and the display device of the embodiment is arranged to automatically show a scale corresponding to the latitude of the film with which the camera is loaded. This embodiment is arranged as described below:

FIG. 10 shows, in a block diagram, the above-stated embodiment. In this case, the MI-COM 8 is provided with, in addition to the arrangement shown in FIG. 1, an input port PN and an output port PM. The port PN is arranged to receive the signal of a contact piece SWDX which is arranged to come into contact with a part of the DX code showing the latitude of the film on the film cartridge. The output port PM is arranged to produce a signal for displaying the scale portions indicated by the marks 21c and 21d in the scale 21a of the display device shown in FIG. 3. As shown in FIG. 11, the scale portions indicated by the marks 21c and 21d in FIG. 3 are composed of LED's. A driving circuit is arranged to drive these LED's.

Figure 12:
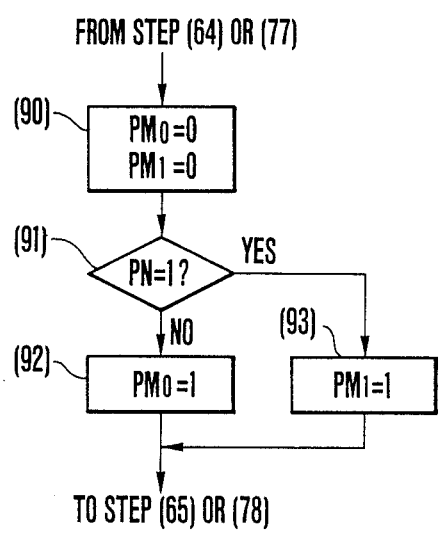
FIG. 12 is a flowchart showing a part of operation to be inserted in the flowchart of FIG. 5E.

FIG. 12 is a flow chart showing a flow of operation to be added to the flow of operation shown in FIG. 5. The additional flow of operation is provided for the purpose of driving the LED's 21c and 21d shown in FIG. 11. This additional flow of operation is inserted in between the steps (64) and (65) and between the steps (77) and (78) shown in FIG. 5. Referring to FIG. 12, at a step (90), both output ports PM0 and PM1 are set at "0" to cause the LED's 21d and 21c shown in FIG. 11 to light up. At a contacts with the DX code of the film cartridge representing the latitude of the film, is discriminated as to whether it is at "1" or "0". If the signal is found to be at "1", the film in use is judged to be of a wide latitude. Then, the operation proceeds to a step (93). In the event that the signal is found to be at "0", the film is judged to be of a narrow latitude and the operation proceeds to a step (92). At the step (92), the output of the output port PM0 is set at "1" to put out the LED 21d causing only the LED 21c to be lit. As a result, in the scale of the display device shown in FIG. 3, only a part indicated by the mark 21c is allowed to light up to inform the photographer of the narrow latitude of the film. At the step (93), on the other hand, the output of the output port PM1 is set at "1" to put out the light of the LED 21c and to allow only the LED 21d to be lit. Then, of the marks 21d and 21c which represent the latitude in FIG. 3, only the part indicated by the mark 21d is allowed to light up to inform the photographer that the latitude of the film is wide. In the operation represented by the flowchart of FIG. 12, both the LED's 21c and 21d are caused to light up at the step (90). However, the time interval between the step (90) and the step (92) or (93) is so short that the state of having both the LED's lit is hardly perceptible by the photographer.

A feature of this embodiment resides in that: The latitude of the film which is loaded on the camera is arranged to be detectable; an the display device 21 is arranged to automatically show the detected latitude by shifting the width of the display scale thereof accordingly. This enables the photographer to see whether a dot display corresponding to the result of light measurement is within that scale. The photographer is thus enabled to know which of the light measuring performances of the multi-photometric operation gives the result of light measurement outside of the range of the latitude allowed.

In the embodiments described, the Ev value is employed as the control exposure value. In accordance with this invention, however, this value may be replaced with the shutter time value Tv or the aperture value Av. In that event, the display device is to be arranged to show a difference from the value Tv or Av.

As apparent from the foregoing description, this gives many advantages to a camera of the kind performing a multi-photometric operation.

What is claimed is:

1. A camera having a memory circuit for memorizing such signal as corresponding to a light measuring output by a light measuring circuit at a time an operation member is operated, comprising:
   (a) said memory circuit respectively memorizing individually each one of said signal corresponding to the light measuring output every time said operation member is operated;
   (b) a first computing circuit for computing such signals as corresponding to a plurality of the light measuring outputs memorized in said memory circuit thus obtaining a computed light measuring value;
   (c) a second computing circuit for obtaining each deviation between said computed light measuring value obtained by said first computing circuit and each one of the signals corresponding to the plurality of light measuring outputs memorized in said memory circuit; and
   (d) a display apparatus for displaying each deviation obtained by said second computing circuit.

2. A camera according to claim 1, wherein said first computing circuit adds such signals as corresponding to each one of the plurality of light measuring outputs memorized in said memorized circuit and, at the same time, such added values are divided by the number of signals added, thus obtaining an average value of the signals corresponding to respective light measuring outputs.

3. A camera according to claim 1, wherein said display apparatus has a plurality of indicating marks arranged in a row and such indicating mark as corresponding to each one of said deviations is placed in a displaying state with the indicating mark at a specific position being placed at a center of said plurality of indicating marks.

4. A camera, comprising:
   (a) a light measuring circuit for generating such output as corresponding to brightness of an object;
   (b) an operation member;
   (c) a memory circuit for entering an output of the light measuring circuit every time said operation member is operated and respectively memorizing said output of the light measuring circuit of every time the operation member is operated;
   (d) a first computing circuit for computing each output of the light measuring circuit memorized previously and an output of the light measuring circuit memorized newly every time said operation member is operated thus obtaining an average value of respectively memorized outputs of the light measuring circuit;
   (e) a second computing circuit for obtaining each deviation between the average value obtained by said first computing circuit and each output of the light measuring circuit of every time the operation member is operated which has been memorized in said memory circuit; and (f) a display apparatus for displaying each deviation obtained by said second computing circuit.

5. A camera according to claim 4, wherein said camera has a counting circuit for counting a number of operations of said operation member, and at the same time said first computing circuit has addition computing means for obtaining a sum of each output of the light measuring circuit memorized in said memory circuit and dividing means for dividing said sum obtained at said addition computing means by the counted value of said counting circuit.

6. A camera having a memory circuit for memorizing such signal as corresponding to a light measuring output by a light measuring circuit at a time an operation member is operated, comprising:

(a) said memory circuit respectively memorizing individually each one of said signal corresponding to the light measuring output every time said operation member is operated;

(b) a first computing circuit for computing a signal corresponding to each one of a plurality of light measuring outputs memorized in said memory circuit thus obtaining a computed light measuring value, said first computing circuit obtaining a new computed light measuring value as such signal as corresponding to a new light measuring output is memorized in the memory circuit in addition to the signals corresponding to previous light measuring outputs by operating said operation member;

(c) a second computing circuit for obtaining each deviation between the computed light measuring value obtained by said first computing circuit and such signal as corresponding to each one of the plurality of light measuring outputs, said second computing circuit obtaining each one of new deviations between said newly computed light measuring value and such signal as corresponding to each one of the plurality of light measuring outputs every time a newly computed light measuring value is obtained by said first computing circuit;

(d) a display device consisting of a plurality of indicating parts arranged in a row, said display device indicating each one of said deviations by placing each one of the indicating parts at a position corresponding to each deviation obtained by said second computing circuit in a display state; and (e) a display control circuit for shifting an indicating state of said indicating part from an indicating part at a certain specific position to an indicating part at another position when each one of new deviations is obtained by said second computing circuit and a shifting is made from an indicating state of the previous deviation by said display device at an indicating part at a certain specific position to an indicating state of the new deviation at an indicating part at another position, said shifting being made in such manner that the indicating parts between the two indicating parts, that is, an indicating part at the certain specific position and the indicating part at another position are placed in an indicating state in turn.

7. A camera comprising:

(a) a light measuring circuit for generating such output as corresponding to brightness of an object;

(b) a memory circuit for memorizing said output of the light measuring circuit;

(c) a setting circuit for setting a reference value for a display, wherein said reference value set by said setting circuit is set variably;

(d) a computing circuit for obtaining a deviation between the reference value set at said setting circuit and the value memorized in said memory circuit, said computing circuit obtaining a new deviation every time the reference value is varied;

(e) a display device consisting of a plurality of indicating parts arranged in a row, said display device indicating said deviation by placing an indicating part at such position as corresponding to the deviation obtained by said computing circuit in a display state; and (f) a display control circuit for shifting an indicating state by said display device from an indicating state of an indicating part at such position as corresponding to a previous deviation to an indicating state of an indicating part at such position as corresponding to a new deviation when the deviation obtained by said computing circuit shifts to a different value from the previous value as the reference value varies, said circuit shifting the indicating state of the indicating parts in such manner that indicating parts between the indicating parts at the two positions corresponding to the previous deviation and the new deviation are placed in an indicating state in turn from the indicating part at such position as corresponding to the previous deviation toward an indicating part at the new position.

* * * * *